April 23, 1968 E. F. WALLACE ETAL 3,379,324
VEHICLE POSITIONING AND UNLOADING MEANS
Filed March 2, 1966 11 Sheets-Sheet 1

FIG.1

INVENTORS
EUGENE F. WALLACE
HAROLD L. SALAUN, JR.
JAMES I. KOTTER
JAMES P. LANIGAN, JR.

BY R. Hoffman

ATTORNEY

April 23, 1968   E. F. WALLACE ETAL   3,379,324
VEHICLE POSITIONING AND UNLOADING MEANS
Filed March 2, 1966   11 Sheets-Sheet 3

INVENTORS
EUGENE F. WALLACE
HAROLD L. SALAUN, JR.
JAMES I. KOTTER
JAMES P. LANIGAN, JR.
BY
R. Hoffman
ATTORNEY

April 23, 1968 E. F. WALLACE ET AL 3,379,324
VEHICLE POSITIONING AND UNLOADING MEANS
Filed March 2, 1966 11 Sheets-Sheet 7

FIG. 9

INVENTORS
EUGENE F. WALLACE
HAROLD L. SALAUN, JR.
JAMES I. KOTTER
JAMES P. LANIGAN, JR.

BY
R. Hoffman
ATTORNEY

FIG.11

FIG.13

United States Patent Office 3,379,324
Patented Apr. 23, 1968

3,379,324
VEHICLE POSITIONING AND UNLOADING MEANS
Eugene F. Wallace, Chalmette, and Harold L. Salaun, Jr., James I. Kotter, and James P. Lanigan, Jr., Metairie, La., assignors to the United States of America as represented by the Secretary of Agriculture
Filed Mar. 2, 1966, Ser. No. 531,273
4 Claims. (Cl. 214—57)

ABSTRACT OF THE DISCLOSURE

A fully automated bale-opening apparatus comprises a stationary portion provided with a reciprocating, fiber-picking, sub-assembly at one end and, at the other end an entrance and an exit opening for receiving a movable truck to supply a bale to be opened. As soon as the truck begins to enter the entrance opening, interlocking means draw the truck completely into the apparatus and a pusher dolly forces the bale against the reciprocating member. When the bale has been completely opened, the pusher dolly automatically returns to its starting position, a waiting truck with a fresh bale pushes the empty truck through the exit opening, and the process is repeated.

---

A non-exclusive, irrevocable, royalty-free license in the invention herein described, for all governmental purposes, throughout the world, with the power to grant sublicenses for such purposes, is hereby granted to the Government of the United States of America.

This invention relates to an improvement over our Fiber Blender disclosed in U.S. Patent No. 3,208,107, which fiber blender is a machine used for opening and blending fibers directly from baled lint cotton, or from any other type natural or synthetic fibers.

It is one object of this invention to automate the sequences of loading and feeding of the fiber blender, thereby providing a more efficient machine for opening and blending textile fibers.

Another object of this invention is to speed up the operation of the fiber blender by reducing time required for loading and feeding, resulting in increased production per hour.

A further object of this invention is to decrease the labor requirements for the operation of the fiber blender as well as to lessen the possibility of operator error.

These and other objects that will be apparent to those skilled in the art are achieved by our invention.

In the machine described in U.S. Patent No. 3,208,107 the baled cotton is fed to a reciprocating head from manually positioned trucks. Our present invention provides a bale manipulating apparatus for use with the reciprocating head of the Fiber Blender of U.S. Patent No. 3,208,107 the combination comprising a system whereby the cotton is automatically fed to the reciprocating head, as is described below.

Reference is made to the drawings. As may best be seen in FIGURES 1 and 8, a movable portion 12 on which fibrous bale 25 is conveyed to the stationary portion 13 is equipped with four guide rollers 75 mounted at each lower corner. The guide rollers 75 contact and roll along guide tracks 76 and 76′, which tracks serve to keep movable portion 12 in alignment as (a) it is moved mechanically into the confines of the stationary portion 13 and (b) as pusher dolly 20 advances the fibrous bale 25 off of the truck into roll defined channel 26.

Figure 2:
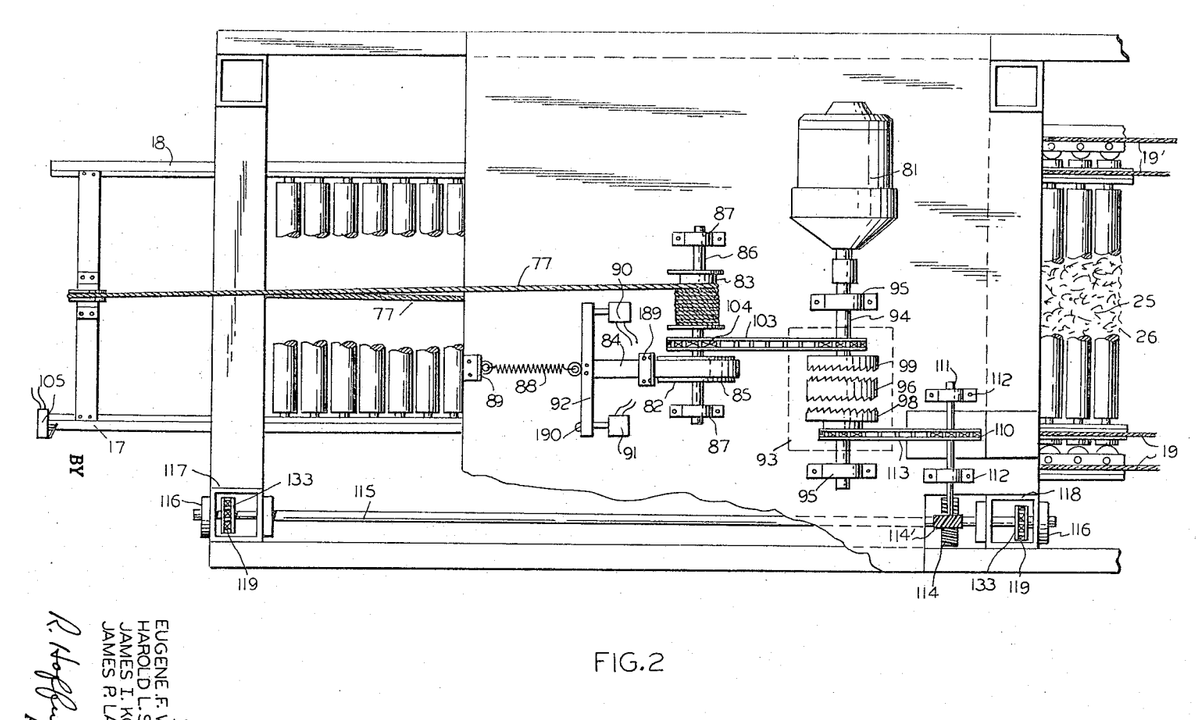
FIGURE 2 is a plan view of the clutch and associated parts of the apparatus with portions broken away to show construction.
Figure 3:
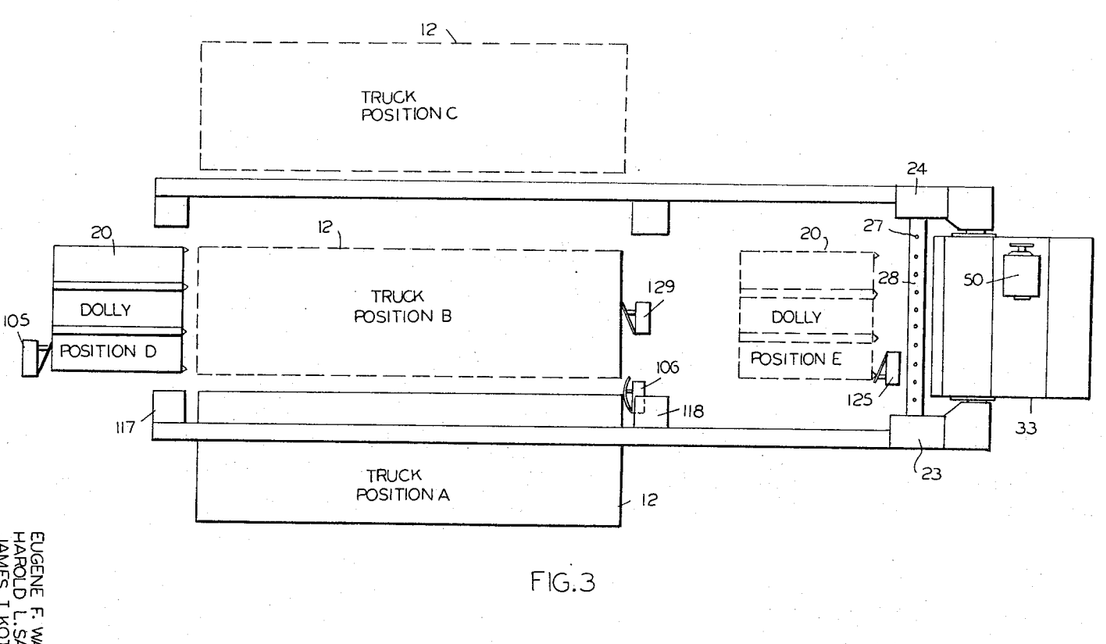
FIGURE 3 is a schematic plan view of the stationary portion, the pusher dolly and a movable portion showing the key positions in the sequence of operations.
Figure 8:
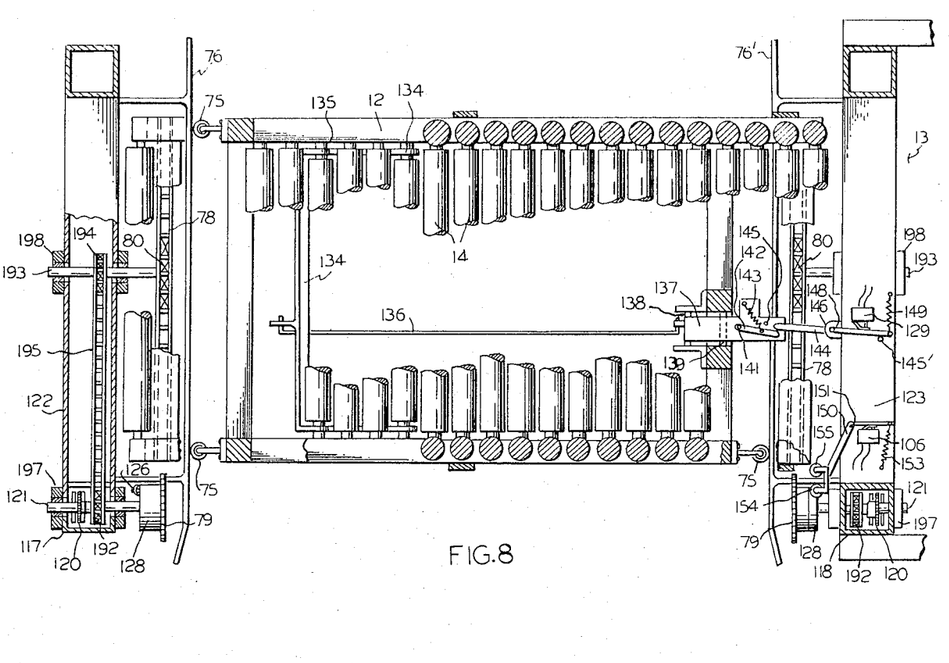
FIGURE 8 is a plan sectional view of rear portion of the apparatus with a movable portion in position B. Parts are broken away to show the following:
Bale load sensing signal device, movable portion guiding and driving components, and control switch mechanisms.

Referring to FIGURES 2, 3, and 8, a movable portion 12 is manually pushed transversely to a position adjacent the side of the stationary portion 13 until its chain racks 78 are engaged with unique drive sprockets 79 at position A (FIGURE 3). Drive sprockets 79 will be described in detail later. The movable portion 12 then becomes mechanically interlocked with the drive system, which also will be described in detail later. As this occurs, normally closed electrical switch 106 (held open by pivotable arm 150 and spring 153) is allowed to close by movable portion 12 contacting pivotable arm roller 154. If pusher dolly 20 is in rearward position D, holding the normally open contacts on switch 105 closed, then gear motor 81 starts. The movable portion 12 is automatically moved to position B by drive sprockets 79 and 80, which are driven by gear motor 81 through the loading drive system. In addition to urging movable portion 12 to position B, the loading drive system serves to maintain movable portion 12 in alignment (by action of the chain racks 78 engaged with drive sprockets 80) as pusher dolly 20 forces bale 25 into roller channel 26.

Figure 1:
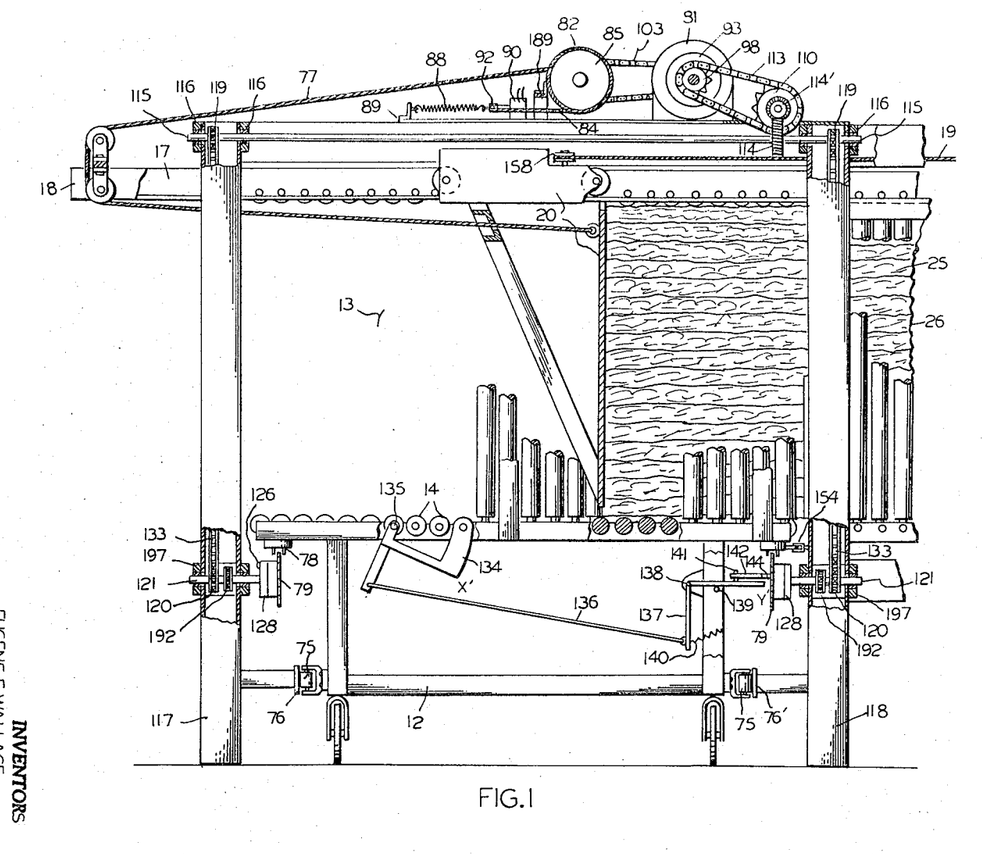
FIGURE 1 is a partial side view of the apparatus with portions broken away showing load and feed mechanisms.

Referring to FIGURES 1 and 3, when bale 25 has been processed, and the sequence of operation is repeated, the loading drive system again automatically moves a loaded movable portion 12 to position B, thereby forcing an empty movable portion 12 to position C, where it can be manually rolled away.

Figure 9:
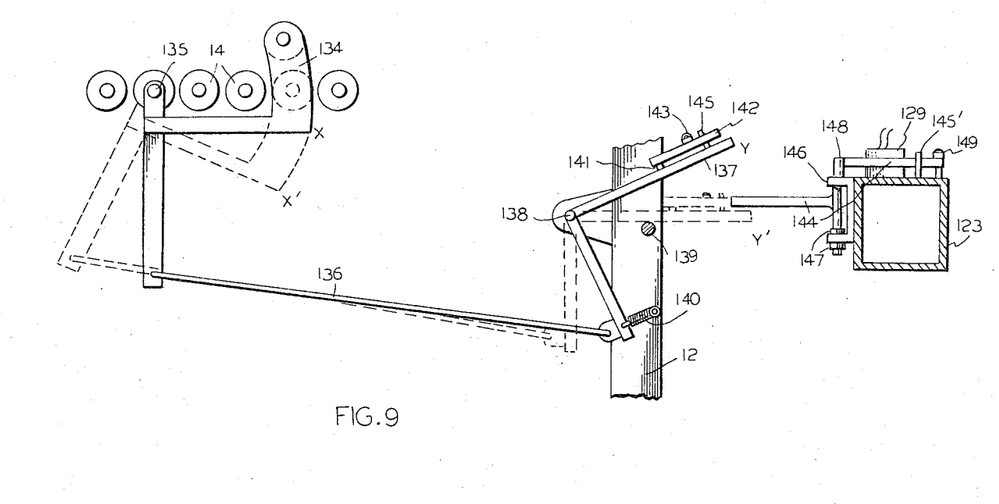
FIGURE 9 is a schematic view of the bale load sensing signal mechanisms.

Referring to FIGURES 3, 8, and 9, in accordance with the sequence of operation, when a loaded movable portion 12 reaches the aligning position B, the gear motor 81 is stopped by the opening of switch 106. As the movable portion 12 reaches position B, physical contact with pivotable arm roller 155 is broken, allowing spring 153 to pivot arm 150, thereby opening switch 106. If the movable portion 12 is loaded with a bale 25, as it moves into aligning position B, normally closed switch 129, (held open by lever 144 and spring 149) closes. Mechanical means for operating both switches 106 and 129 will be described in further detail later.

Figure 13:
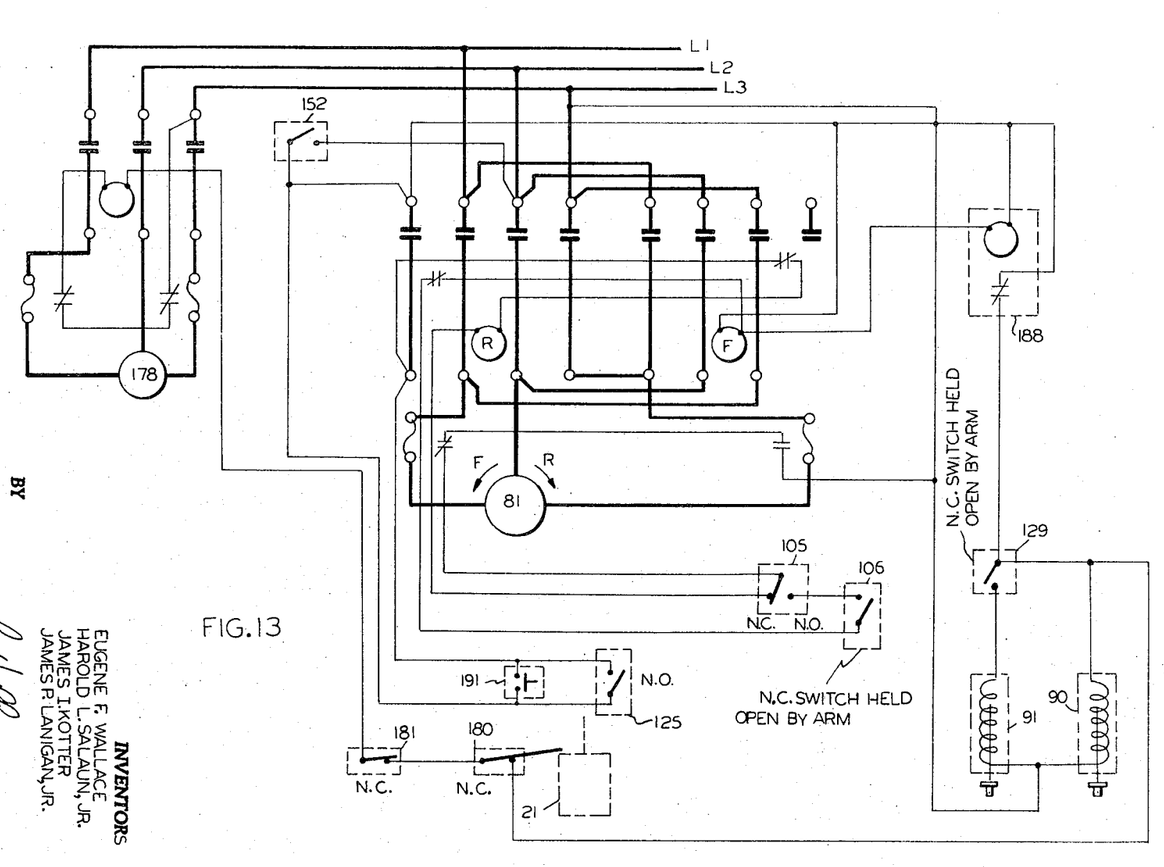
FIGURE 13 is a schematic electrical wiring diagram of the apparatus.

Referring to FIGURES 8 and 13, switches 106 and 129 are normally closed to eliminate critical adjustments of pivotable switch actuating arms. Switch 152 is an on-off manual control switch for the automatic circuits.

Referring to FIGURES 1, 2, and 13, when switch 106 opens, relay 188 is de-energized, thus closing its normally closed contacts. This energizes solenoids 90 and 91 (if switch 129 has been previously closed) causing brake 82 to fully release pusher dolly 20 which then moves forward with no restriction.

Figure 10:
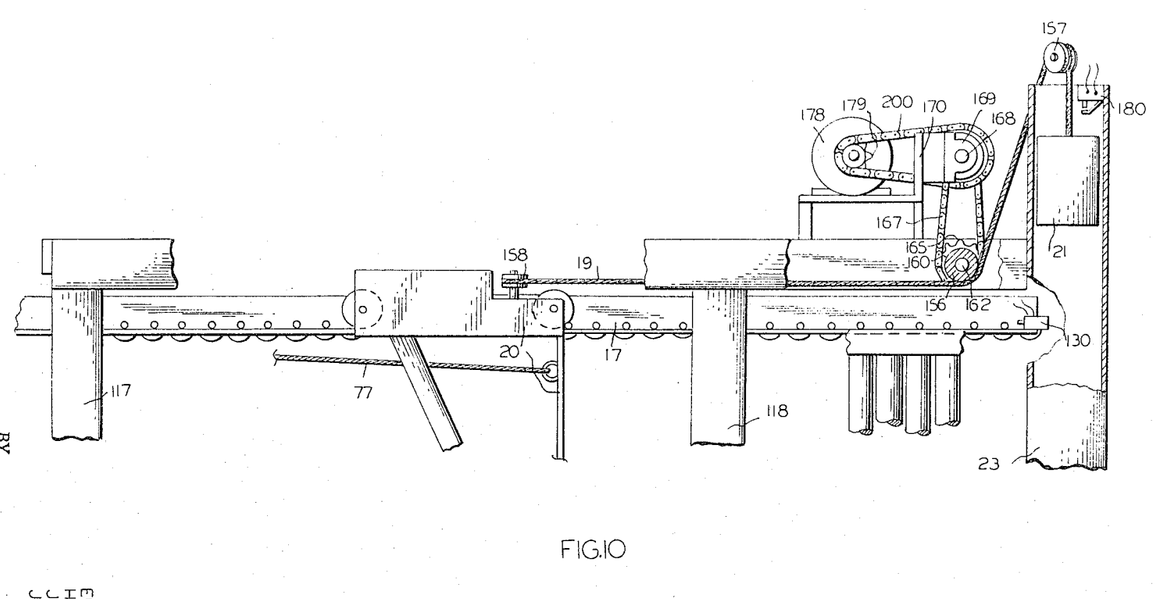
FIGURE 10 is a partial side view of the apparatus showing installation of weight lifting mechanism.
Figure 11:
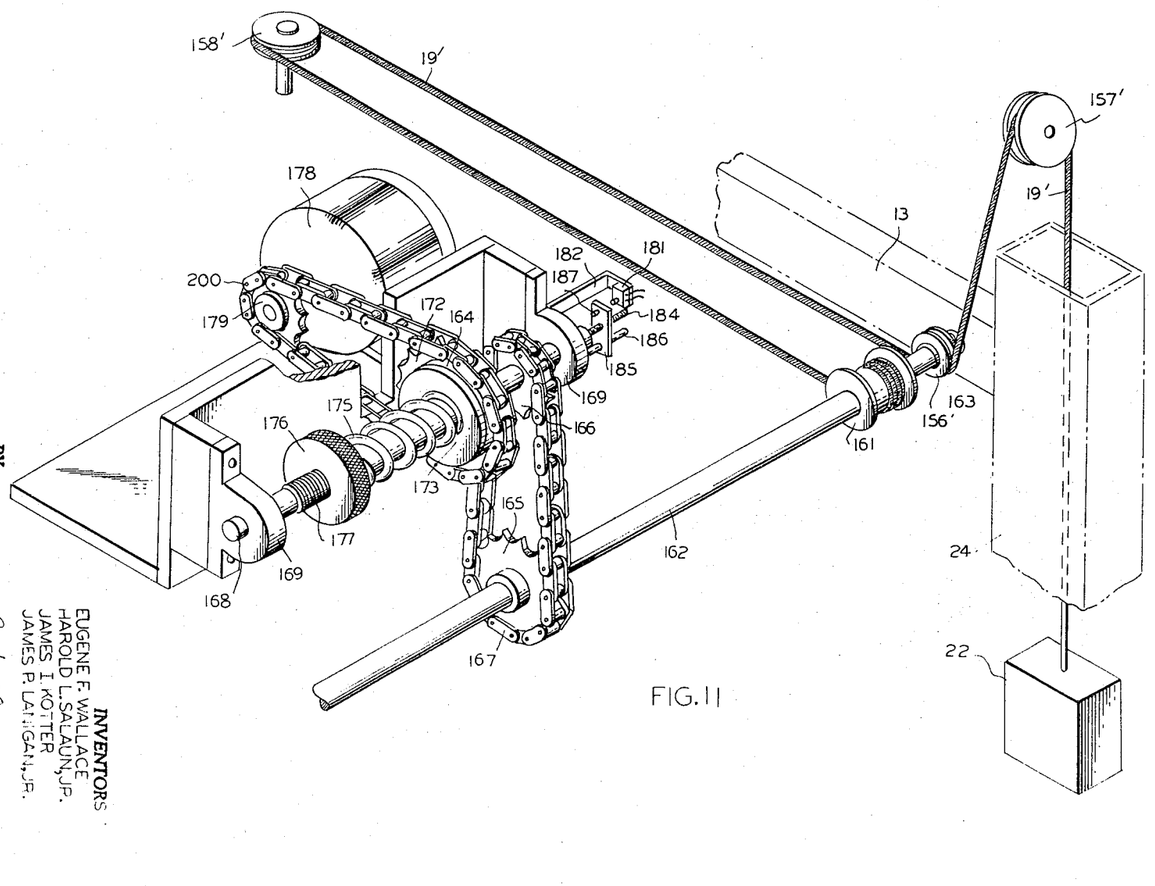
FIGURE 11 is a pictorial view of the weight lifting mechanism in part.

Referring to FIGURES 1, 2, 3, and 13, if the movable portion 12 is not loaded as it moves into aligning position B, switch 129 is not closed, therefore when switch 106 de-energizes relay 188, only solenoid 90 is energized, resulting in partial release of brake 82, thus pusher dolly 20 moves forward at a retarded rate of travel. Pusher dolly 20 is pulled forward by weights 21 and 22, located in forward columns 23 and 24. (FIGURES 10 and 11.)

Referring to FIGURES 1, 2, and 3, brake 82 and cable drum 83 are fastened to shaft 86. Cable 77 is wound on cable drum 83 when pusher dolly 20 is retracted to position D from position E. Shaft 86 is supported by bearings 87. The flexible brake band 84 anchored to straddle support 189 is tightened around brake drum 85 by means of tension spring 88 anchored to angle 89. Spring 88, under tension, tightens brake band 84 enough to stop pusher dolly 20 in any position.

Referring to FIGURES 1, and 2, as solenoid 90 is energized, crosslinking bar 92 pivots about stop pin 190, causing tension on brake band 84 to lessen, thus cable drum 83 unwinds and the pusher dolly 20 moves forward slowly.

Referring again to FIGURES 1 and 2, if power failure should occur, pusher dolly 20 stops immediately by the action of the fail safe mechanism. Upon removal of voltage, de-energized solenoids 90 and 91, allow spring 88 to tighten brake band 84 sufficiently stop cable drum 83 instantly.

Referring to FIGURES 2 and 3, after the load has been removed from the movable portion, pusher dolly 20 reaches forward position E and physically contacts switch 125 which starts gear motor 81 in reverse direction by means of conventional reversing switch. At any time during the sequence of operation, pusher dolly 20 may be returned to position D by manually closing switch 191 (FIGURE 13).

Figure 4:
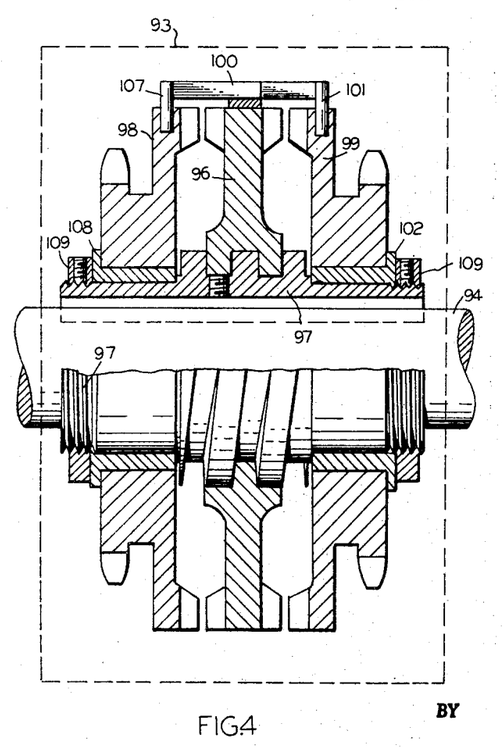
FIGURE 4 is a cross-sectional view of the reversible, double-drive clutch mechanism, an integral part of the apparatus. This mechanism moves the pusher dolly back and forth through the apparatus.
Figure 5:
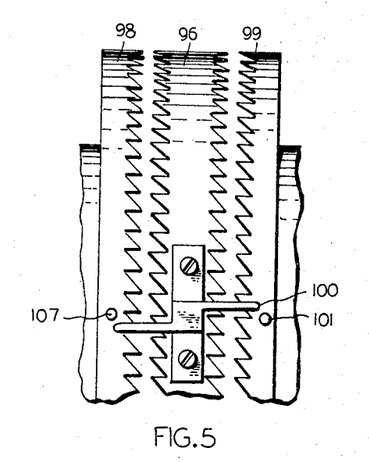
FIGURE 5 is a partial plan view of the clutch assembly showing the indexing bar and pins.

Referring to FIGURES 2 and 4, gear motor 81 is coupled to reversible double-drive clutch 93 which clutch is the subject matter of U.S. 3,158,244 and which clutch is installed on shaft 94 supported by bearings 95. As gear motor 81 starts in reverse direction, toothed traveler 96, which has an internal thread, matching threaded sleeve 97, disengages and backs away from toothed drive sprocket 98. Toothed traveler 96, moved by the motion of the drive shaft 94, is guided into aligned engagement with toothed drive sprocket 99 by means of its indexing bar 100, bearing on indexing pin 101.

When toothed drive sprocket 99, fitted with bushing 102, and free to rotate on sleeve 97, engages toothed traveler 96, pusher dolly 20 is retracted to position D by means of cable 77 attached to and wound on cable drum 83. Cable drum 83 is driven by toothed drive sprocket 99 through chain 103 and sprocket 104.

Referring to FIGURES 2 and 3, upon pusher dolly 20 reaching position D, it physically engages and opens switch 105 which stops gear motor 81. If a movable portion 21 is in position A, switch 106 is closed, thus switch 105 reverses gear motor 81 and de-energizes solenoids 90 and 91, applying brake 82 by means of spring 88. See electrical schematic diagram FIGURE 13.

Referring to FIGURES 2 and 4, reversal of gear motor 81 results in toothed traveler 96 disengaging toothed drive sprocket 99 and moving into aligned engagement with toothed drive sprocket 98, by means of its indexing bar 100, bearing on indexing pin 107. Toothed drive sprocket 98, free to rotate on bushing 108 before engagement, is driven by toothed traveler 96.

Referring again to FIGURES 2 and 4, the said reversible double-drive clutch 93 is held in assembly by retaining nuts 109, engaging threads on sleeve 97. Sleeve 97 is fastened to drive shaft 94. Toothed drive sprocket 98 drives sprocket 110, which is fastened to jackshaft 111 and is supported by bearings 112. Toothed drive sprocket 98 is connected to sprocket 110 by chain 113.

By means of reversible double-drive clutch 93, the automatic load system is now interlocked with drive gear motor 81, and the retracting system of the pusher dolly 20, (FIGURE 1) is freed completely. This was accomplished merely by reversing gear motor 81.

It will be readily appreciated by those skilled in the art that the same results can be accomplished by means of other clutches, for example, magnetic clutches.

Figures 6, 7:
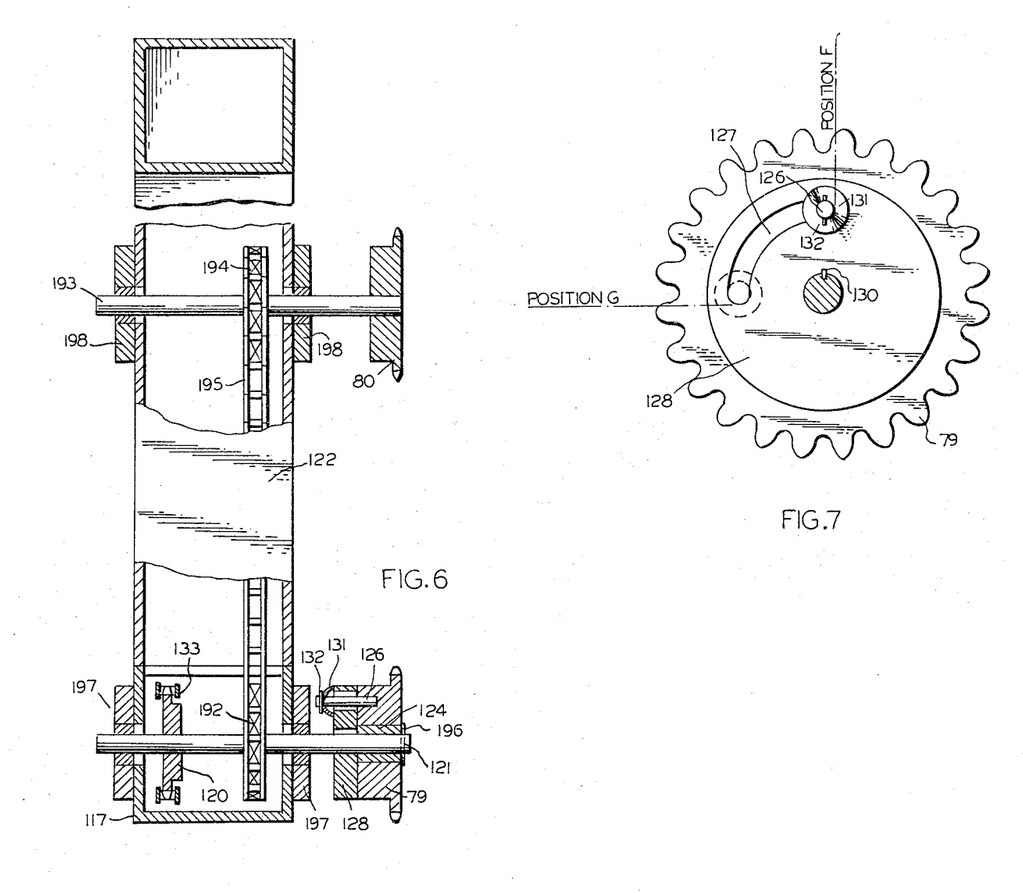
FIGURE 6 is a plan sectional view in part of the driving mechanism with cross sections of drive sprockets. This mechanism urges a movable portion into, through, and out of the stationary portion.
FIGURE 7 is a view of the driving disk and sprocket assembly.

Referring to FIGURES 2, 6, and 8, jackshaft 115, supported by bearing 116, mounted on columns 117 and 118, is driven by gears 114 and 114'. Sprockets 119 are fastened to jackshaft 115 and are connected by chain 133 to sprockets 120 which are also encased in columns 117 and 118 at a level in line with lower cross-members 122 and 123. Sprockets 120 and 192 are fastened to shafts 121, which are supported by bearings 197 fastened to columns 117 and 118. Sprockets 194 are fastened to shafts 193, supported by bearings 198 which are fastened to cross-members 122 and 123. Sprockets 192 and 194 are connected by chain 195. Sprockets 80, which move truck 12, are fastened to shafts 193 located in cross-members 122 and 123.

Referring to FIGURES 6 and 7, drive sprockets 79 are equipped with bushings 124 and thus are free to rotate on shafts 121. Drive pins 126 mounted in sprockets 79 extend through circular slots 127 in drive disks 128, which are keyed to shafts 121 by meanss of keys 130. Cupped spring washers 131 which are held on drive pins 126 by lock pins 132 apply a slight frictional drag between drive sprockets 79 and drive disks 128 to prevent uncontrolled relative rotation. Drive sprockets 79 are held on shafts 121 by retaining rings 196.

Referring to FIGURES 3, 6, and 7, when a movable portion 12 initially engages drive sprockets 79, drive pins 126 are in position F in drive disk 128. As the movable portion 12 is manually pushed to aligning position A, drive sprockets 79 rotate on shafts 121 until drive pins 126 reach end of slots 127 at position G. When drive motor 81 (FIGURE 2) starts and is engaged with loading system, drive disks 128 rotate with shafts 121. Drive sprockets 79 remain stationary until the end of slots 127 contact pins 126 at position F. The sprockets 79 then rotate, urging the movable portion 12 into the confines of the stationary portion 13.

Referring to FIGURES 1 and 9, the load sensing mechanism installed on a movable portion 12 consists of a load feeler arm 134 which is mounted on and pivots about shaft 135. Shaft 135 supports one of the multiplicity of horizontal support rollers 14. As a load 25 rests on the horizontal support rollers 14, feeler arm 134 is depressed to position X' causing rod 136 to pivot arm 137 about shaft 138 against stop 139 to position Y'. When a load 25 is not on horizontal support rollers 14, then load feeler arm 134 is held in position X by spring 140 attached to arm 137. Arm 137 is then in position Y.

Pin 141 fastened to arm 137, supports pivotable arm 142. Spring 143 is mounted to arm 137 and is fastened to pivotable arm 142. As a movable portion 12 moves out of the confines of the stationary portion 13 to position C, arm 142 pivots about pin 141. After arm 142 passes rocker arm 144, spring 143 returns arm 142 to its normal actuating position against stop 145. Rocker arm 144 is held and pivotably mounted on support 146, which is attached to frame cross-member 123. Set collars 147 prevent movement of rocker arm 144 in vertical direction and thus maintain alignment. Stop 145' limits the travel of rocker arm 144 as the movable portion 12 moves from position B to position C (FIGURE 3). When rocker arm 137 is in position Y' against stop 139, pivotable arm 142 is in alignment with rocker arm 144; therefore, as a movable portion 12 moves into position B, rocker arm 144 is forced to pivot about point 148 closing normally closed switch 129. As previously explained, switch 129 determines whether brake 82 will be fully or partially released. Spring 149 is mounted on cross-member 123 and fastened to rocker arm 144. After a movable portion 12 has moved out of the confines of the stationary portion 13, spring 149 causes rocker arm 144 to open normally closed switch 129.

Referring to FIGURES 1, 9, and 3, once feeler arm 134 has been depressed to position X' by a load 25 and a movable portion 12 is within the confines of the stationary portion 13 at position B, switch 129 is closed and will remain closed until the movable portion 12 moves from position B. Even though the load 25 has moved forward past the feeler arm 134, which is in position X', arm 134 cannot return to position X because of the construction of arm 137. Arm 137 extends under rocker arm 144 in position Y', therefore, arm 144 prevents arm 137 from moving to its position Y while a movable portion 12 is in position B. This is done so brake 82 will not be applied while pusher dolly 20 is either moving forward to position E or returning to position D.

Referring to FIGURES 3 and 8, normally closed switch 106 is mounted on cross-member 123 and is actuated by lever arm 150 which is pivotally mounted at point 151 to cross-member 123. Spring 153 anchored to cross-member 123 and connected to lever arm 150 pivots lever arm 150 clockwise opening switch 106 when rollers 154 and 155 of lever arm 150 is not in contact with a movable portion 12.

Contacts of switch 106 are closed when a movable portion 12 contacts lever arm roller 154 in position A and is held closed until the movable portion 12 physically breaks contact with roller 155 as position B is reached.

Figure 12:
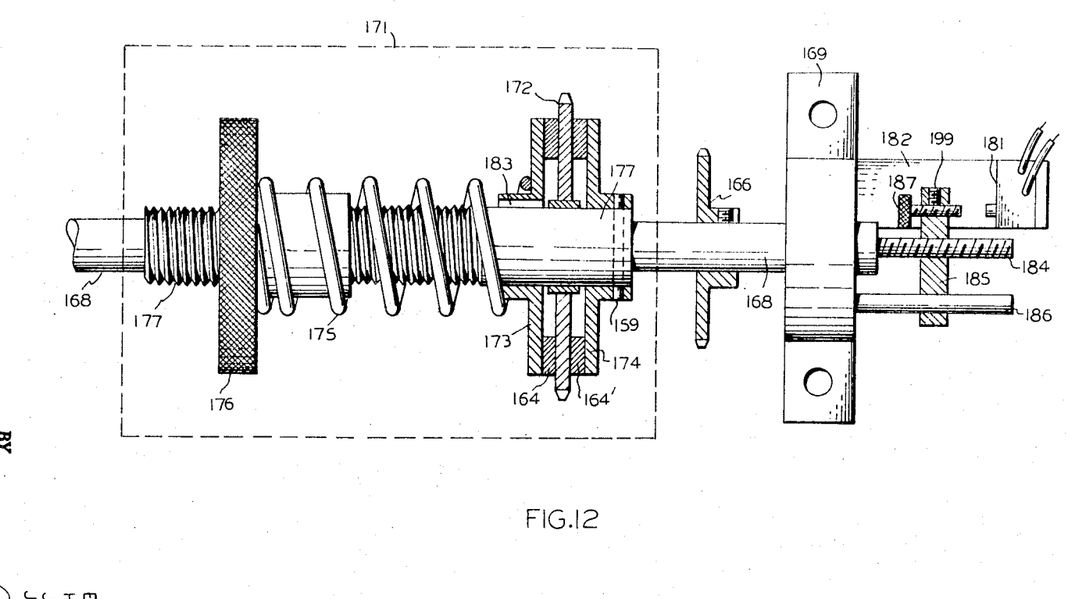
FIGURE 12 is a partial cross-sectional view of the weight lifting friction clutch and limit switch mechanism.

Referring to FIGURES 10, 11, and 12, the automatic weight lifting mechanism consists of weights 21 and 22 suspended in columns 23 and 24 by cables 19 and 19'. Cables 19 and 19' pass over pulleys 157 and 157' and under pulleys 156 and 156', which are free to rotate on shaft 162. Cables 19 and 19' continue around pulleys 158 and 158' (mounted on each side of pusher dolly 20), and are wound around and attached to cable drums 160 and 161. Cable drums 160 and 161 are fastened to shaft 162 mounted in bearings 163, which are mounted on frame of the stationary portion 13. Sprocket 165 is fastened to shaft 162 and driven by sprocket 166 through chain 167. Sprocket 166 is fastened to shaft 168 supported by bearings 169 mounted on plate 170. The friction disk clutch mechanism 171 is mounted on shaft 168. Its sprockets 172, free to rotate on sleeve 177, is sandwiched between clutch disks 173 and 174 equipped with friction surfaces 164 and 164', respectively. Disk 174 is fastened to sleeve 177 and shaft 168 by means of pin 159. Disk 173 is free to move transversely on sleeve 177 but is restricted with respect to rotation by key 183. Force exerted by coil spring 175, in compression on disk 173, results in sufficient frictional force developed by the sandwiching of sprocket 172 between friction surfaces 164 and 164' of clutch disks 173 and 174, to drive shaft 162 by means of sprockets 165 and 166 and chain 167. The load applied by spring 175 is adjustable by means of adjusting nut 176 threaded on sleeve 177 which is fixed to shaft 168. Sprocket 179 attached to gear motor 178, drives sprocket 172 by means of chain 180.

The weights 21 and 22 exert a force on the pusher dolly 20, equal to twice their weight. Because of the two to one mechanical advantage, cable drums 160 and 161 must have a capacity equal to twice the distance moved by the pusher dolly 20 minus the available length of travel for the weights 21 and 22 in the forward columns 23 and 24.

When switch 106 is opened by a movable portion 12 as previously explained, relay 188 is de-energized, closing normally closed relay contacts. This energizes hold-in coil of magnetic starter if switches 180 and 181 are closed, starting motor 178. Normally closed switch 180 is mounted on the inner face of column 23 and is opened by physical contact with weight 21 when it reaches top of column 23. If weights 21 and 22 reach top of columns 23 and 24 before drums 160 and 161 are filled with cable, switch 180 will open and motor 178 will stop.

Switch 181 is mounted on plate 182 which is fastened to bearing 169. Threaded rod 184 is attached to shaft 168. Actuating plate 185 is threaded and moves on threaded rod 184. Actuating plate 185 is guided and restrained from rotating by pin 186 which is mounted in and extending from bearing 169. As shaft 168 rotates winding up cable 19 and 19' on drums 160 and 161, actuating plate 185 moves toward the outer end of threaded rod 184. Switch 181 is so located that at the instant cable drums 160 and 161 become filled with cable 19 and 19', switch 181 is opened by actuating plate adjustment screw 187, thus stopping motor 178. Adjustment screw 187 is held in desired position by set screw 199.

*Operational stages of the apparatus for manipulating bales*

The automatic loading and feeding systems of the apparatus are energized when the toggle switch 152 is manually turned on.

(1) With pusher dolly 20 in position D and a loaded movable portion 12 in position A, motor 81 runs clockwise. Movable portion 12 moves from position A to position B.

(2) When movable portion 12 reaches position B, motor 81 stops, thus stopping the movable portion 12. Brake 82 is released by solenoids 90 and 91, as they are energized by normally closed contacts on relay 188.

(3) With brake 82 release, dolly 20 is pulled from position D to position E by weights 21 and 22, thus closing switch 180 at top of column 23. When switch 180 is closed motor 178 starts, winding cables 19 and 19' on cable drums 160 and 161.

(4) As the load 25 is being cleared from a movable portion weights 21 and 22 approach the bottom of the columns 23 and 24. Cable drums 160 and 161 are winding cables 19 and 19'.

(5) If a dense bale causes slow processing, one of the following conditions occur: (1) the weights will reach the top of the columns; or (2) the drums will fill with cable. Under either condition the motor 178 will stop (6) During processing as the dolly approaches position E, drums 160 and 161 are filled with cables 19 and 19' and the weights are near the bottom of columns 23 and 24. Motor 178 is not running.

(7) A loaded movable portion 12 should be in position A. This is a manual operation and must be done any time between operation number (2) and operation number (8).

(8) When dolly 20 reaches position E, motor 81 starts and runs in a counter-clockwise direction, returning dolly 20 to position D.

As the above takes place the weights are lifted to the top of the respective columns and drums 160 and 161 are emptied by means of slip clutch 171.

(9) When dolly 20 reaches position D motor 81 stops and reverses, this action moves the new loaded movable portion 12 from position A to position B and the empty movable portion moves from position B to position C.

We claim:

1. In a bale-opening apparatus having a reciprocating, fiber-picking, sub-assembly at one end of a rigid, elongated framework, a confined area at the other end of the framework for receiving a mobile, dirigible truck member carrying a bale to be opened, matched, positionally opposed, ingress and egress openings at said other end of the framework for receiving and discharging said truck member, said openings being adapted by reason of size and shape to register with and permit one-way, directed passage of an individual truck member in and out of the confines of said framework, and unloading means mounted on the framework longitudinally movable to urge the bale against the reciprocating fiber-picking sub-assembly, the improvements which comprise:

(a) mutually engageable, coacting guide means on said truck member and framework for aligning a truck member against the ingress opening for (1) induction therethrough into the confines of said framework, (2) to position and immobilize the truck member within the confines of the framework, and (3) subsequently to direct the ejection of the truck member through the egress opening;

(b) first motor drive means mounted on said framework;

(c) driven means on said truck member coacting with the first motor drive means adapted to engage said first motor drive means to induct said truck member into, through, and out of the confines of the stationary framework;

(d) first position-sensing signal means mounted on the framework adjacent the ingress opening, said first position-sensing signal means adapted to sense a correctly-positioned truck member at the ingress opening;

(e) means connecting the first position-sensing signal means with the first motor drive means to activate said first motor drive means to induct the truck member into, through, and out of the confines of the framework;

(f) second position-sensing signal means mounted within the confines of said framework; and (g) load-sensing signal means positioned on the truck member for contact engagement with the second position-sensing signal means, said load-sensing means being activated by presence of a bale on the truck member to contact said second position-sensing signal means, thereby to deactivate the first motor drive means to stop a bale-carrying truck member within the confines of the framework in a position for unloading, said load-sensing signal means breaking contact engagement with the second position-sensing signal means when a bale has been removed from the truck member thereby to reactivate the first motor drive means to eject the unloaded truck member from the confines of the framework through the egress opening.

2. The apparatus of claim 1 wherein the unloading means comprises a vertically disposed, horizontally movable pusher dolly adapted by reason of size and shape to pass concurrently through the confines of the framework and an included truck via aligned coincident open ends of both and to clear a load from the load-bearing area of the truck.

3. The apparatus of claim 2 provided with drive means connected to the pusher dolly, said drive means adapted to urge the pusher dolly in a horizontal path across the load bearing area of a truck member correctly positioned for unloading within the framework thereby to clear the load bearing area.

4. The apparatus of claim 3 wherein the stationary framework has mounted thereon:

(a) reversible second motor drive means connected to the pusher dolly;

(b) third position-sensing signal means adjacent the starting position of the pusher dolly in the vicinity of the bale-carrying truck member and also adjacent the load-sensing means on the truck member;

(c) means connecting the third position-sensing signal means to the second motor drive whereby a signal transmitted by the presence of a correctly positioned, bale-carrying truck member within the confines of the framework activates the second motor drive to urge the pusher dolly into contact with the bale to push said bale in the direction of the reciprocating, fiber-picking sub-assembly;

(d) fourth position-sensing signal means at the travel termination position of the pusher dolly in the vicinity of the fiber-picking sub-assembly; and (e) means connecting said fourth position-sensing signal means to the reversible second motor drive means, said fourth position-sensing signal means being adapted to stop and reverse said reversible second motor drive means, thereby to return the pusher dolly to its starting position at the unloaded truck member.

References Cited

UNITED STATES PATENTS 3,045,846 7/1962 Clark ______________ 214—310
3,208,107 9/1965 Kotter et al.

ROBERT G. SHERIDAN, *Primary Examiner.*